United States Patent
Krauss

(10) Patent No.: US 10,176,073 B2
(45) Date of Patent: Jan. 8, 2019

(54) CONTROLLING A SYSTEM UNDER TEST USING A COGNITIVE CONTROL BASED TEST RUNNER

(71) Applicant: INTERNATIONAL BUSINESS MACHINES CORPORATION, Armonk, NY (US)

(72) Inventor: Kirk J. Krauss, Los Gatos, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

(21) Appl. No.: 15/441,867

(22) Filed: Feb. 24, 2017

(65) Prior Publication Data

US 2018/0246801 A1 Aug. 30, 2018

(51) Int. Cl.
G06F 11/36 (2006.01)
G06N 99/00 (2010.01)

(52) U.S. Cl.
CPC ...... *G06F 11/3612* (2013.01); *G06F 11/3664* (2013.01); *G06F 11/3692* (2013.01); *G06N 99/005* (2013.01)

(58) Field of Classification Search
CPC ............. G06F 11/3612; G06F 11/3664; G06F 11/3692; G06N 99/005
USPC ........................... 717/124–135; 714/37, 38.1
See application file for complete search history.

(56) References Cited

U.S. PATENT DOCUMENTS

| | | | |
|---|---|---|---|
| 7,752,502 B2 | 7/2010 | Clee et al. | |
| 9,501,384 B2 | 11/2016 | Eilam et al. | |
| 2004/0103396 A1 | 5/2004 | Nehab | |
| 2004/0250156 A1* | 12/2004 | Weichselbaum | G06F 11/0793 714/2 |
| 2005/0049729 A1* | 3/2005 | Culbert | G06F 1/206 700/50 |
| 2005/0137818 A1* | 6/2005 | Yumoto | G06F 11/263 702/108 |
| 2007/0094256 A1* | 4/2007 | Hite | G06F 17/2785 |
| 2010/0117579 A1* | 5/2010 | Culbert | G06F 1/20 318/471 |
| 2014/0327619 A1* | 11/2014 | Chang | G06F 3/03543 345/163 |
| 2017/0255343 A1* | 9/2017 | Catania | G06F 3/0482 |
| 2017/0315714 A1* | 11/2017 | Shyamsundar | G06F 3/0482 |

OTHER PUBLICATIONS

"What is cognitive analytics?", <http://www.expertsystem.com/what-is-cognitive-analytics/>, Jul. 29, 2016, p. 1-2.*

* cited by examiner

*Primary Examiner* — Qing Chen
(74) *Attorney, Agent, or Firm* — Griffiths & Seaton PLLC

(57) ABSTRACT

Embodiments comprise cognitive control of an application by a processor. Current state data representing a current state of an application may be collected during a test run in a testing environment such that the current state data is cognitively analyzed in relation to one or more known states. One or more control inputs may be determined for guiding the application to a target state based on the analysis.

20 Claims, 16 Drawing Sheets

CONTROLLING A SYSTEM UNDER TEST USING A COGNITIVE CONTROL BASED TEST RUNNER

BACKGROUND OF THE INVENTION

Field of the Invention

The present invention relates in general to computing systems, and more particularly to various embodiments for controlling a system under test using a cognitive control based test runner.

Description of the Related Art

Computing systems and applications may be found in the workplace, at home, or at school. Computing system and application development requires extensive repetitive testing throughout the development process of a computing system. For example, development of a new version of the system or application may require a repetitive series of tests to determine whether the changes made to create the version have affected the system or application in an intended or unintended manner. As computing systems and applications become increasingly complex, testing the computing systems and applications also becomes increasingly complex. A large number of unique combinations of control flow paths and executable modules may be tested for each computing system and application.

SUMMARY OF THE INVENTION

Various embodiments for controlling a system under test (herein "SUT"), using a cognitive control based test runner by one or more processors, are provided. In one embodiment, by way of example only, a method for controlling an application being tested using cognitive analysis in a virtual computing environment, again by a processor, is provided. Current state data representing a current state of an application may be collected during a test run in a testing environment, such that the current state data is cognitively analyzed in relation to one or more known states. One or more control inputs may be determined for guiding the application to a target state based on the analysis. The testing environment may be a virtualized computing environment that may employ machine learning and may also be part of an Internet of Things (IoT) network.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
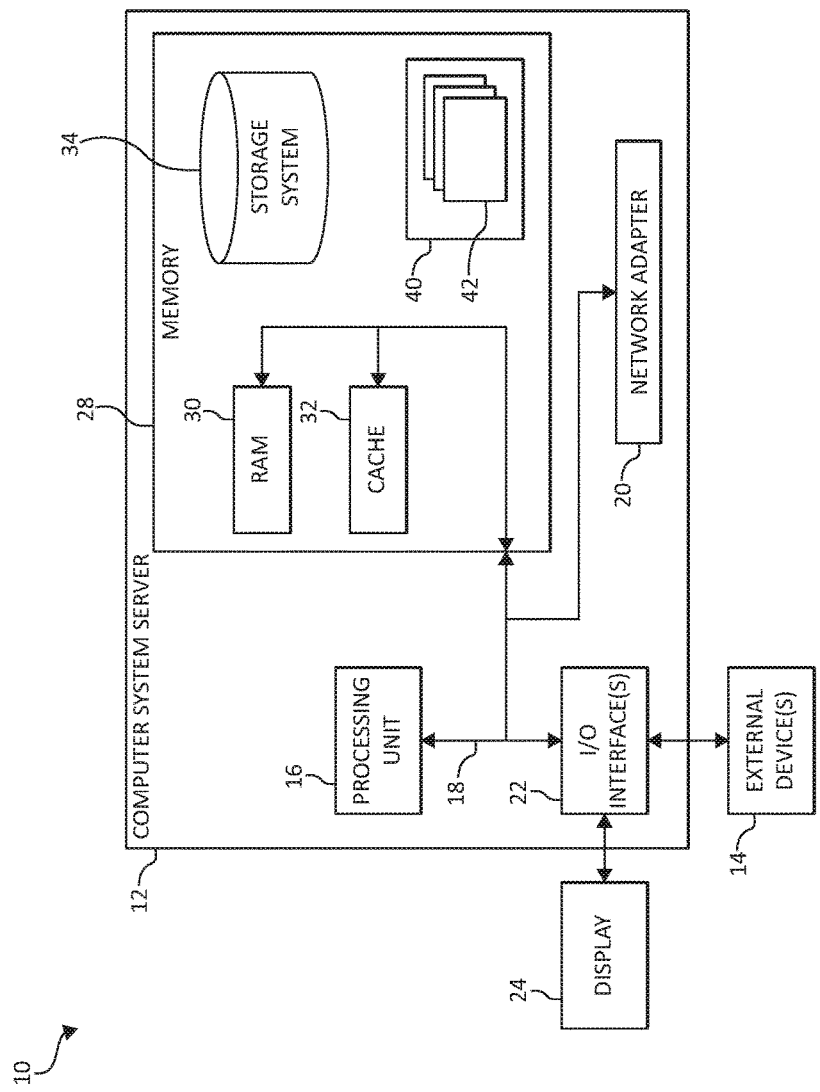
FIG. 1 is a block diagram depicting an exemplary cloud computing node according to an embodiment of the present invention.

As computing systems, particularly computing applications, become increasingly complex, testing the application or system also becomes increasingly complex. A large number of unique combinations of control flow paths and executable modules may be tested for each application or system. One approach to application testing includes assigning users who may manually input various parameters. Another approach may include using test scripts for testing a software application. Test scripts may validate predetermined behavior or may, in highly concurrent scenarios, "push load at the system". One of the challenges of manually inputting various parameters (e.g., "pounding on the system" by a user) may include the fact that misbehavior observed based on a given set of steps may be difficult to reproduce, unless the steps were carefully noted by a user who witnessed the misbehavior. Often, timings of the steps are also significant, these timings being difficult for an individual user to estimate for enablement of problem reproduction needed to address the misbehavior. One of the drawbacks or challenges of validation scripts include, for example, the fact that the validation scripts cannot cover features or functionality unless it has been thought through, in advance, by someone writing the scripts. As computing systems and applications change over time, the scripts must evolve along with the computing systems and applications. Further, exhaustive validation scripts are typically not combinable with users manually inputting various parameters to direct the computing systems and applications. A drawback of pushing a load at the system may include the fact that the load is usually very simple—a highly repetitive script-driven scenario that does a poor job of imitating real-world load.

Thus, the present invention provides a virtualized test runner for a system under test (SUT) using cognitive analysis and machine learning. Various embodiments are provided for controlling one or more SUTs using a cognitive control based test runner by one or more processors. Current state data representing a current state of an application (e.g., a SUT) may be collected during a test run in a testing environment such that the current state data is cognitively analyzed in relation to one or more known states. One or more control inputs may be determined for guiding the application to a target state based on the analysis. The testing environment may be a virtual computing environment that may employ machine learning and may also be in an Internet of Things (IoT) network.

The present invention may also maintain and track each input and output of the SUT, along with the timing of the inputs and outputs of the SUT, such that during a test run, each of the steps or operations of the SUT is maintained and stored for later retrieval and analysis. In one aspect, the SUT may perform, in parallel or sequentially, the execution of validation scripts that determine one or more control inputs (e.g., simulating "pounding on the system"). Moreover, the present invention provides for multiple test runners to perform, in parallel or sequentially, the execution of validation scripts that determine one or more control inputs guiding the SUT. This form of computer-implemented parallelism can achieve greater efficiency than operator-controlled pounding on the system and yet can achieve results more or less similar to real-world load on the computing system and application.

By providing a virtualized test runner for a SUT using cognitive analysis and machine learning, significant advantages over the current state of the art are achieved, particularly, for example, when changes occur, either to the SUT source code, or to various aspects of the underlying system (operating system updates, system display scheme, etc.), or to the data or data sources available to the SUT. A cognitive control based test runner may attempt to reach the target states regardless of changes to screen content, style, colors, or even new intervening levels of additional or modified dialogs that the test runner must pass through to reach the target state. An example that walks through a few such situations is given at bottom. Other advantages include providing the ability to record and play back one or more control gestures using specific timings, which can ease problem recreation in time-dependent scenarios for testing. Also, the present invention provides the ability of simultaneously applying and using multiple cognitive analysis and machine learning virtualized test runners that are instructed to reach a variety of target states selected by the operator or machine learning suggestions so as to apply (e.g., "push") a realistic load at the SUT, and to play back any failing scenario, again with perfect timings according to one or more defined timeframes.

The present invention may also provide for collecting, as the SUT is running, one or more control inputs including for example, but not limited to, keyboard input, mouse gestures, or other input, along with the timing of each particular input, and collecting data representing state changes involving the SUT responsive to that input. The collected state data can include any or all aspects of text and graphics data produced by the SUT, along with the timing of that output, for use in state analysis. The state analysis can go beyond the data collection associated with prior art script-driven testing methods, as such a script-driven method may control entire SUT input but does not capture or analyze entire SUT output, or timings, particularly for use in determining further SUT input within the same run.

Based on the analysis of an information corpus comprising prior executions or test runs (e.g., "past runs") and/or user documentation, the cognitive control based test runner may control the SUT in lieu of user interaction (e.g., human input). The cognitive control based test runner may employ a machine learning mechanism or other technology to learn and make decisions that change the SUT's state and to collect and record each of those state changes. In this way, the cognitive control based test runner is enabled to make decisions based on the collecting of state changes in one or more applications including the SUT. To ensure complete and adequate test coverage, the cognitive control based test runner may attempt to reach a target state determined based on text and graphics data produced by the SUT when it reaches one or more particular states while progressing towards the target state. When one or more target states have been reached, test coverage may be considered complete.

Further, to reach those target states, the cognitive control based test runner may perform a situation assessment based on analysis of text and graphics produced by the SUT and may make control decisions based on assessment outcomes. That is, the cognitive control based test runner cognitively assesses application states and makes decisions for the control of running applications, via situation assessment.

As an additional aspect, the cognitive control based test runner may also be able to start and/or stop (on-demand) the SUT. For example, once the SUT is stopped, the cognitive control based test runner can check and cognitively assess any output logs or other outcomes for further flagging of misbehavior (e.g., performance by the SUT less than defined threshold level of defined or expected performance), so that all observed misbehavior can be found in one place and time-collated based on the cognitive control based test runner's own logs.

It should be noted that the Internet of Things (IoT) is an emerging concept involving computing devices that may be embedded in objects, such as appliances, and connected through a network. An IoT network may include one or more IoT devices or "smart devices", which are physical objects such as appliances with computing devices embedded therein. Many IoT devices are independently operable, but they also may be paired with a control system or with a distributed control system such as one running over a cloud-computing environment.

It should also be noted that data is increasingly processed through a variety of geographically disbursed computing components, where, for example, a local node may contain a set of data processing components yet remain in remote communication with other portions of the distributed data processing system. To wit, a test runner may be employed for one or more IoT devices with data that may not be locally stored or processed on the user's local computer, but that is instead hosted by one or more distributed storage components that are in remote communication with the local computer. This type of data storage may, in some cases, be referred to as "cloud" or "cloud-based" storage.

It is understood in advance that although this disclosure includes a detailed description on cloud computing, implementation of the teachings recited herein are not limited to a cloud computing environment or IoT network environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud-computing node is shown. Cloud computing node 10 is only one example of a suitable cloud-computing node and is not intended to suggest any limitation as to the scope of use or functionality of embodiments of the invention described herein. Regardless, cloud-computing node 10 is capable of being implemented and/or performing any of the functionality set forth hereinabove.

In cloud computing node 10 there is a computer system/server 12, which is operable with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network or IoT network. In a distributed cloud-computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), an IoT network, and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
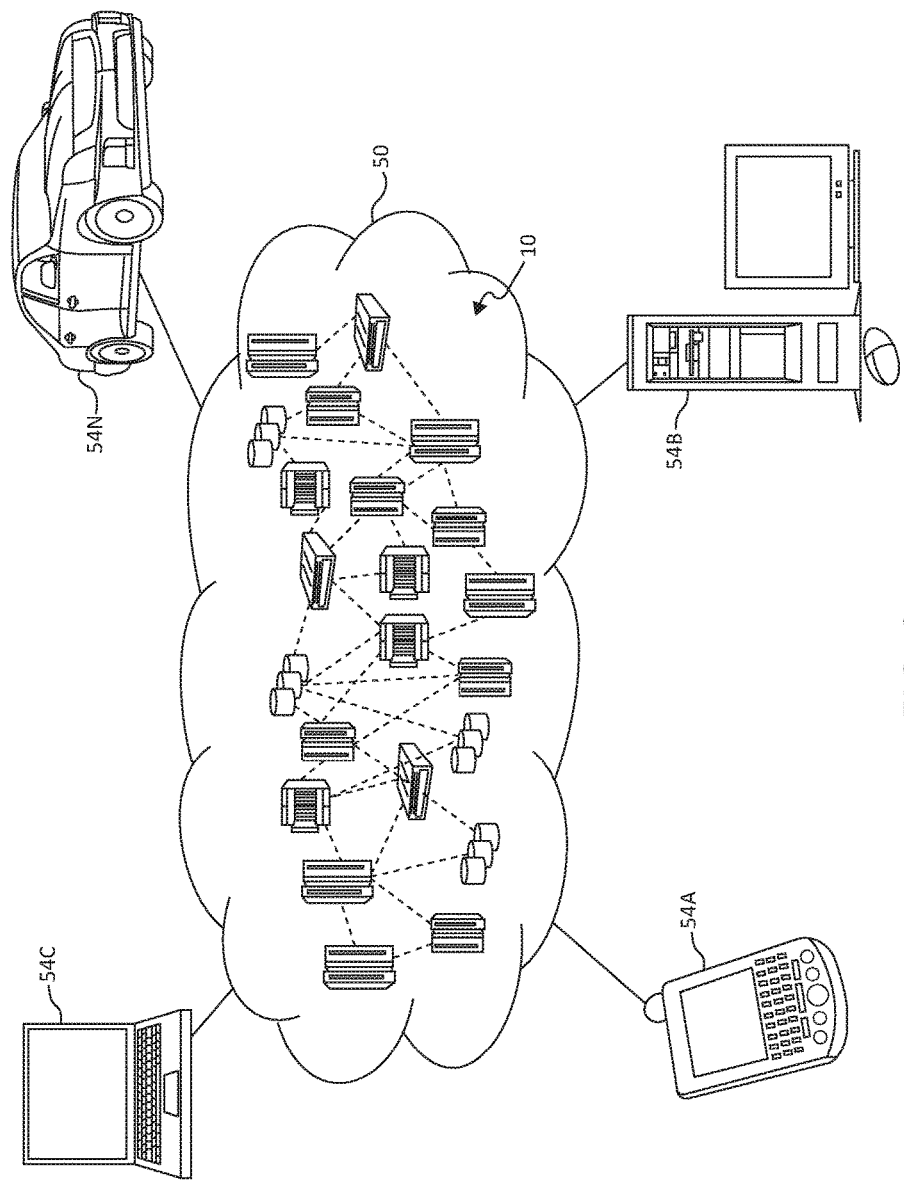
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid Clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
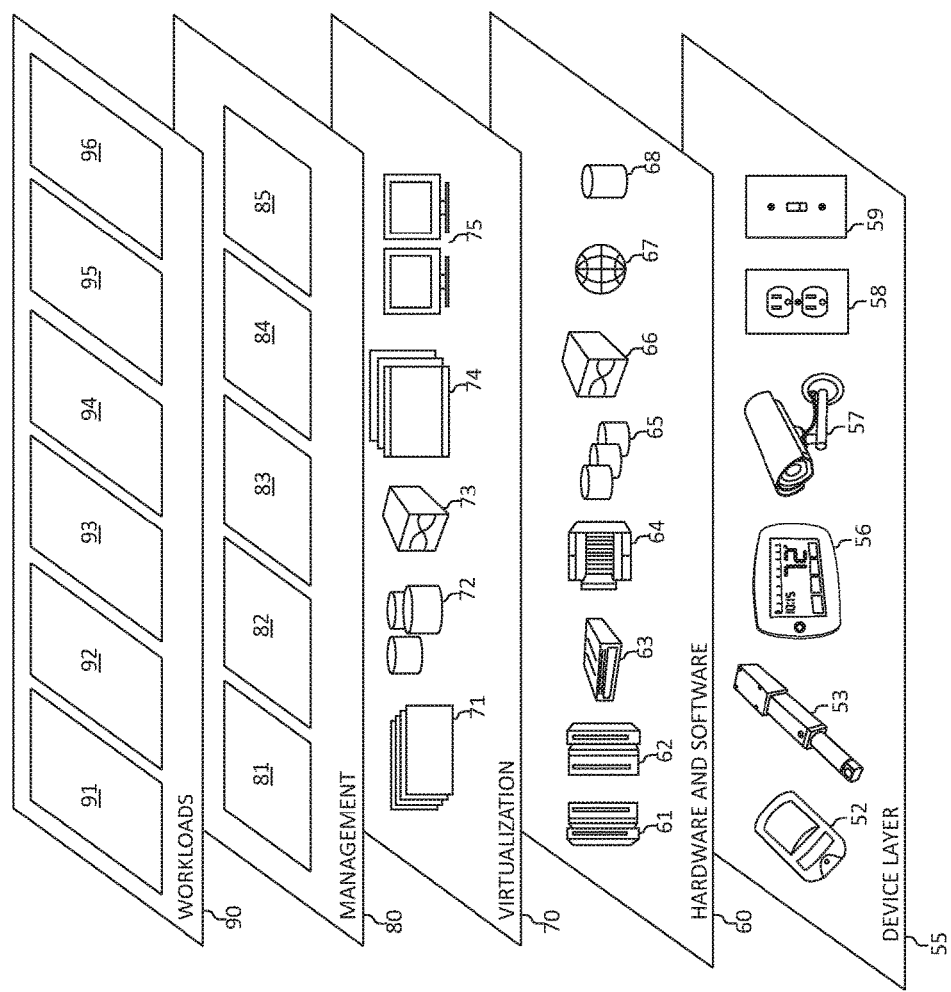
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud-computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provides cost collecting as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud-computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various configuring settings for various computer-controlled devices using a cognitive control based test runner for controlling application workloads and functions 96. In addition, configuring settings for various computer-controlled devices using workloads and functions 96 for controlling a SUT using a cognitive control based test runner may include such operations as data analysis (including data collection and processing from various environmental sensors), semantic analysis, image analysis, control input analysis, device analysis, and/or data analytics functions. One of ordinary skill in the art will appreciate that the configuring settings for various computer-controlled devices using workloads and functions 96 for controlling a SUT using a cognitive control based test runner may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
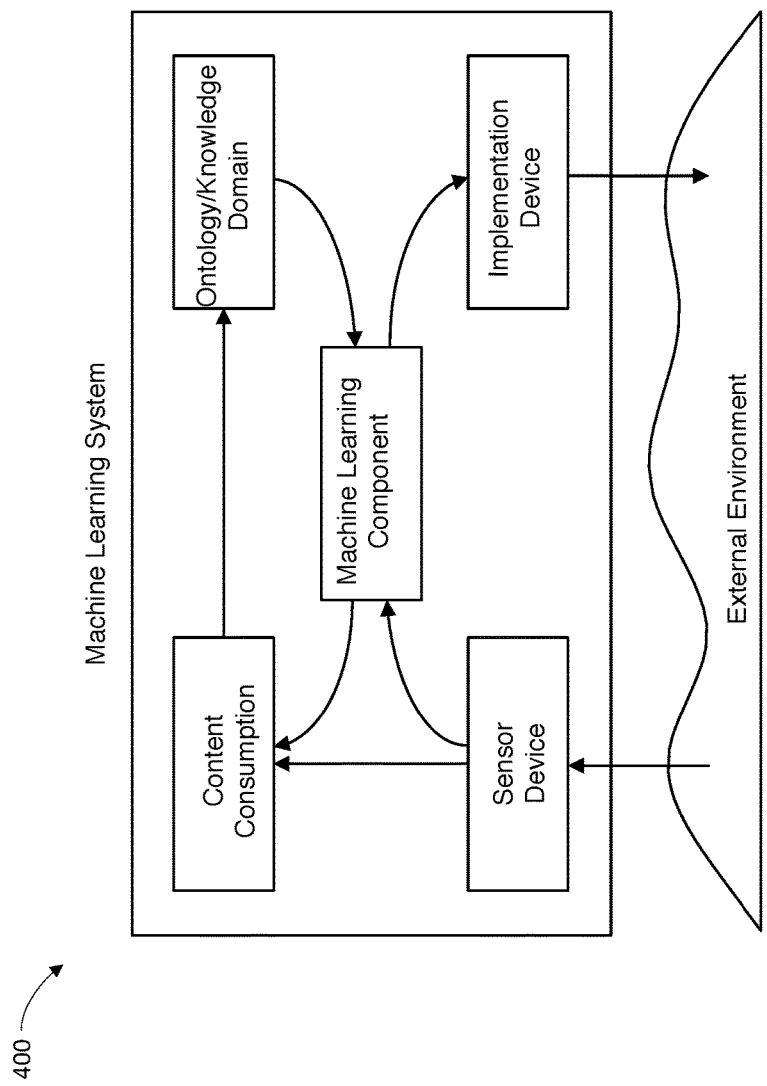
FIG. 4 is an additional block diagram depicting cognitive control system architecture according to an embodiment of the present invention.

Turning now to FIG. 4, a block diagram depicting cognitive control system architecture 400 according to various mechanisms of the illustrated embodiments, is shown. In one aspect, each of the devices, components, modules, and/or functions described in FIGS. 1-3 may also apply to the devices, components, modules, and functions of FIG. 4. Also, one or more of the operations and steps of FIGS. 1-3 may be included in one or more operations or actions of FIG. 4. In one aspect, the machine learning system 400 enables a system under cognitive control to exhibit goal-oriented behavior in sensing, reasoning, and action; the system flexibly changes its goals and behavior depending on situational context and experience; the system enables action in unstructured environments without human intervention and robustly responds to surprise; the system also is able to interact with humans and other cognitive systems to jointly solve a complex task.

The machine learning system 400 provides for these features by understanding the present situation within the external environment (including awareness of the machine learning system 400 itself, the SUT, the surrounding environment, and other agents) while implementing one or more functions such as, for example, active sensing, extraction and abstraction of relevant information, acquisition of semantic knowledge, comparison with previous experience (e.g., prior test runs), and knowledge updating, thus modifying a current situation and reacting to any unpredicted changes. That is, the machine learning system 400 may employ and implement a machine learning mechanism for decision making, planning, reasoning, learning, and adaptation. Thus, the machine learning system 400 provides for estimating a current state as well as for purposeful modification of the current state as needed to operate on partial/uncertain information. The machine learning system may include a cognition operation. As used herein, "cognition" may be the mental process of knowing, including aspects such as awareness, perception, interpreting, reasoning and judgment. Cognitive computing can include application of various machine learning systems or algorithms trained on a common corpus of information. In conjunction with a response to any given situation, the various machine learning systems or algorithms each can provide a score. Each score can be representative of the confidence or relevance of the response. A cognitive system can choose a response, from a set of responses from the various machine learning systems or algorithms, based on the provided scores. In this manner, the cognitive system can make effective use of a variety of machine learning systems or algorithms.

In one aspect, the machine learning system 400 includes a content consumption component which may include a learning operation, an ontology or "knowledge domain" that may include a knowledge gathering operation, a machine learning component (or machine learning model), one or more sensor device(s), and/or one or more implementation devices. The one or more sensor devices and implementation devices may communicate and/or be associated with an external environment.

The machine learning component may include using a perception operation involving the sensor device. The perception operation may include the acquisition of sensor data, information, and/or the interpretation of the information for learning and making one or more decisions. The perception operation may include contextual/semantic knowledge learning, analysis, and interpretation. Further, one or more contextual/semantic relationships may also be learned, perceived, analyzed, and/or determined for making one or more decisions by the machine learning component.

A content consumption or "learning" operation may be performed to learn, identify, extract, and/or map one or more concepts, ideas, percepts, and/or behaviors onto actions using an ontology or knowledge domain. An implementation operation may implement an output of a sensor device and/or machine learning component. The implementation device may communicate, control, and/or provide the output to an external environment. The learning operation may include analyzing, learning, and/or updating new or previously acquired knowledge, which may be used for cognitive functionalities to impact, determine, influence, and/or affect environmental situations and contexts. The knowledge may be continuously updated, and/or may modulate a task execution at runtime.

The ontology may be a knowledge domain that may be used for storing, maintaining, and/or updating a knowledge of a plurality of subjects, topics, and/or concepts, including a hierarchy and sub-hierarchy of concepts created where the hierarchy of concepts is derived by ingesting a corpus of knowledge of software behavior generally or of software behavior related to the SUT in particular and includes a hierarchy of linguistic terms and/or graphical symbols and gestures related to software systems and applications. The ontology or knowledge domain may also be used to identify semantic relationships between a plurality of subjects, topics, and/or concepts and related subjects, topics, and/or concepts.

In one aspect, the term "domain" is a term intended to have its ordinary meaning. In addition, the term "domain" can include an area of expertise for a system or a collection of material, information, content and/or other resources related to a particular subject or subjects. For example, a domain can refer to financial, healthcare, advertising, commerce, scientific, industrial, educational, medical and/or biomedical-specific information. A domain can refer to information related to any particular subject matter or a combination of selected subjects.

The term "ontology" is also a term intended to have its ordinary meaning. In one aspect, the term "ontology" in its broadest sense may include anything that can modeled as an ontology, including but not limited to, taxonomies, thesauri, vocabularies, and the like. For example, an ontology may include information or content relevant to a domain of interest or content of a particular class or concept, such as software behavior. Content can be any searchable information, for example, information distributed over a computer-accessible network, such as the Internet. A concept can generally be classified into any of a number of concepts which may also include one or more sub-concepts. Examples of concepts may include, but are not limited to, scientific information, healthcare information, medical information, biomedical information, business information, educational information, commerce information, financial information, pricing information, information about individual people, cultures, groups, sociological groups, market interest groups, institutions, universities, governments, teams, or any other group. The ontology can be continuously updated with the information synchronized with the sources, adding information from the sources to the ontology as models, attributes of models, or associations between models within the ontology.

Furthermore, the machine learning component may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back-propagation, Bayesian statistics, the naive Bayes classifier, a Bayesian network, a Bayesian knowledge base, case-based reasoning, decision trees, inductive logic programming, Gaussian process regression, group method of data handling (GMDH), learning automata, learning vector quantization, minimum message length (decision trees, decision graphs, etc.), lazy learning, instance-based learning, the nearest neighbor algorithm, analogical modeling, probably approximately correct (PAC) learning, ripple down rules, a knowledge acquisition methodology, symbolic machine learning algorithms, sub-symbolic machine learning algorithms, support vector machines, random forests, ensembles of classifiers, bootstrap aggregating (bagging), boosting (i.e., the learning ensemble meta-algorithm), ordinal classification, regression analysis, information fuzzy networks (IFN), statistical classification, linear classifiers, Fisher's linear discriminant, logistic regression, the perceptron algorithm, support vector machines, quadratic classifiers, the k-nearest neighbor algorithm, and hidden Markov models. Some non-limiting examples of unsupervised learning which may be used with the present technology include the artificial neural network, data clustering, expectation-maximization, the self-organizing map, the radial basis function network, vector quantization, the generative topographic map, the information bottleneck method, IBSEAD (distributed autonomous entity systems based interaction), association rule learning, the Apriori algorithm, the Eclat algorithm, the FP-growth algorithm, hierarchical clustering, single-linkage clustering, conceptual clustering, partitional clustering, the k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning means described in this paragraph are known and are considered to be within the scope of this disclosure.

Figure 5:
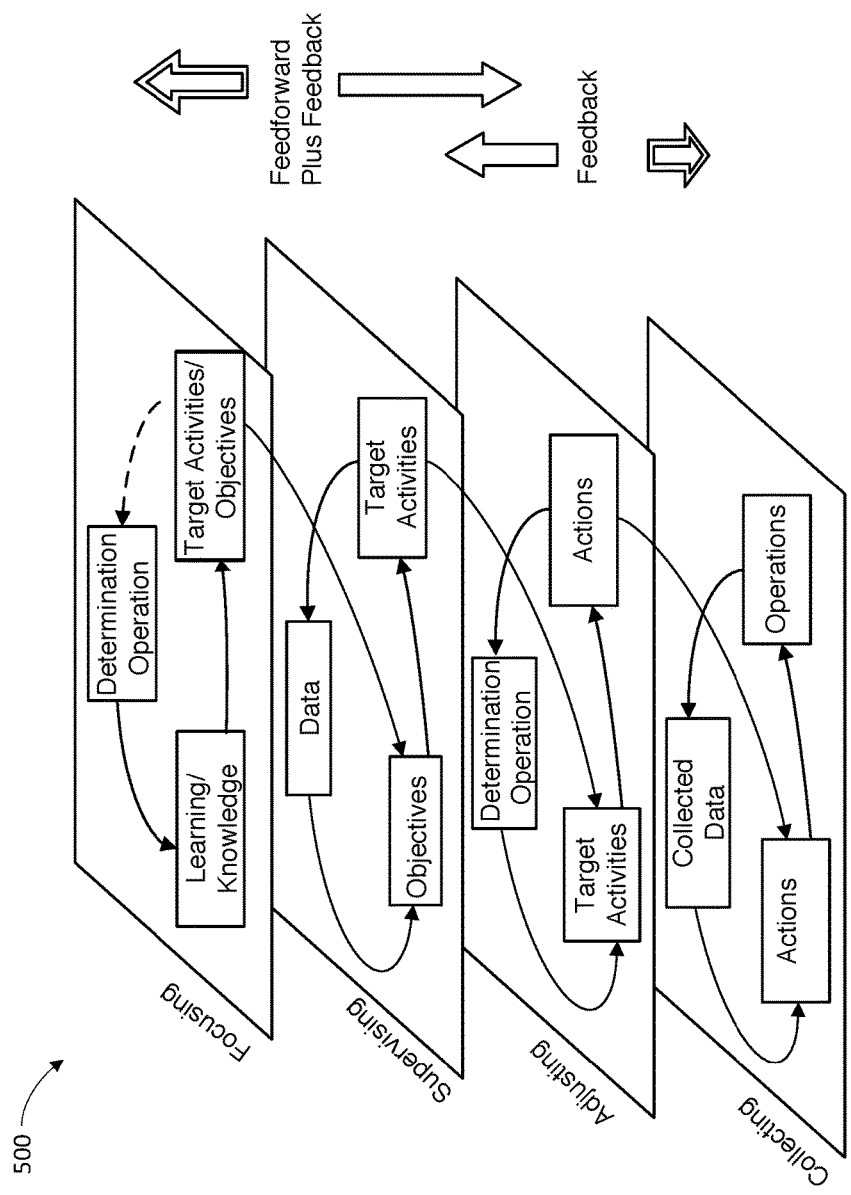
FIG. 5 is an additional block diagram depicting an extended control model in accordance with aspects of the present invention.

FIG. 5 is an additional block diagram depicting an extended control model ("ECOM") 500 in accordance with aspects of the present invention. In one aspect, each of the devices, components, modules, and/or functions described in FIGS. 1-4 also may apply to the devices, components, modules, and functions of FIG. 5. Also, one or more of the operations and steps of FIGS. 1-4 may be included in one or more operations or actions of FIG. 5.

The ECOM 500 provides means of describing how a joint cognitive system (JCS) can perform at several layers of control in a hierarchical system, such as, for example, the levels of collecting, adjusting, supervising, and objective creating. The ECOM 500 includes one or more concurrent control loops, some of which may be of a closed-loop or reactive type while others are of an open-loop or proactive type, and some others are mixed.

The collecting level (e.g., bottom layer) may include the various actions, operations, and/or activities such as, for example, gathering, obtaining, and/or collecting data, signals, sensor data, measurements, feedback, actions, adjustment operations, performance operations, and/or target values, which may be required to enable the JCS to operate within a range of defined performance values or defined performance boundaries. The objectives for the activities involved in this layer may be determined by the adjusting layer. The activities of the collecting level may be primarily of the closed-loop type.

The adjusting at the adjusting layer may also be a closed-loop activity, but may involve some anticipatory control. The activities such as, for example, target activities (e.g., plans/objectives), actions (e.g., actions/target values), and/or situation assessment, at the adjusting layer may or may not be automatically performed. The plans and objectives for the adjusting layer may be provided by the supervising layer. However, the goals and plans provided may be changed, depending on the circumstances.

At the supervising layer, the objectives may be set and plans may be activated into actions. The supervising layer activities may include target activities (e.g., goals, plans), objectives, and/or information analyzing, gathering, and/or collecting. The focusing layer includes the objectives of target activities (e.g., creating, setting, and/or planning goals and/or directives), determination operations (e.g., situation assessments), and learning or gathering information for a knowledge domain or ontology. The focusing layer may be designed for either creating target activities/objectives and focusing on target activity, goal achievement and learning. Also, sub-target activities and sub-objectives may be generated, following the target activities/objectives procedure, which may be automated and related to testing, performance, and/or objective behavioral outcomes. The target activity/objective operations may be an open-loop type operation, implemented by a set of actions, and may occur over a selected or defined time period.

The ECOM 500 provides for adjusting itself as a closed-loop activity, although feedforward plus feedback operations may be executed and performed. Also, a feedback operation may be performed. That is, the feedback may serve for collecting and adjusting, while the feedforward plus feedback operations may serve for adjusting, supervising, and focusing.

Figure 6:
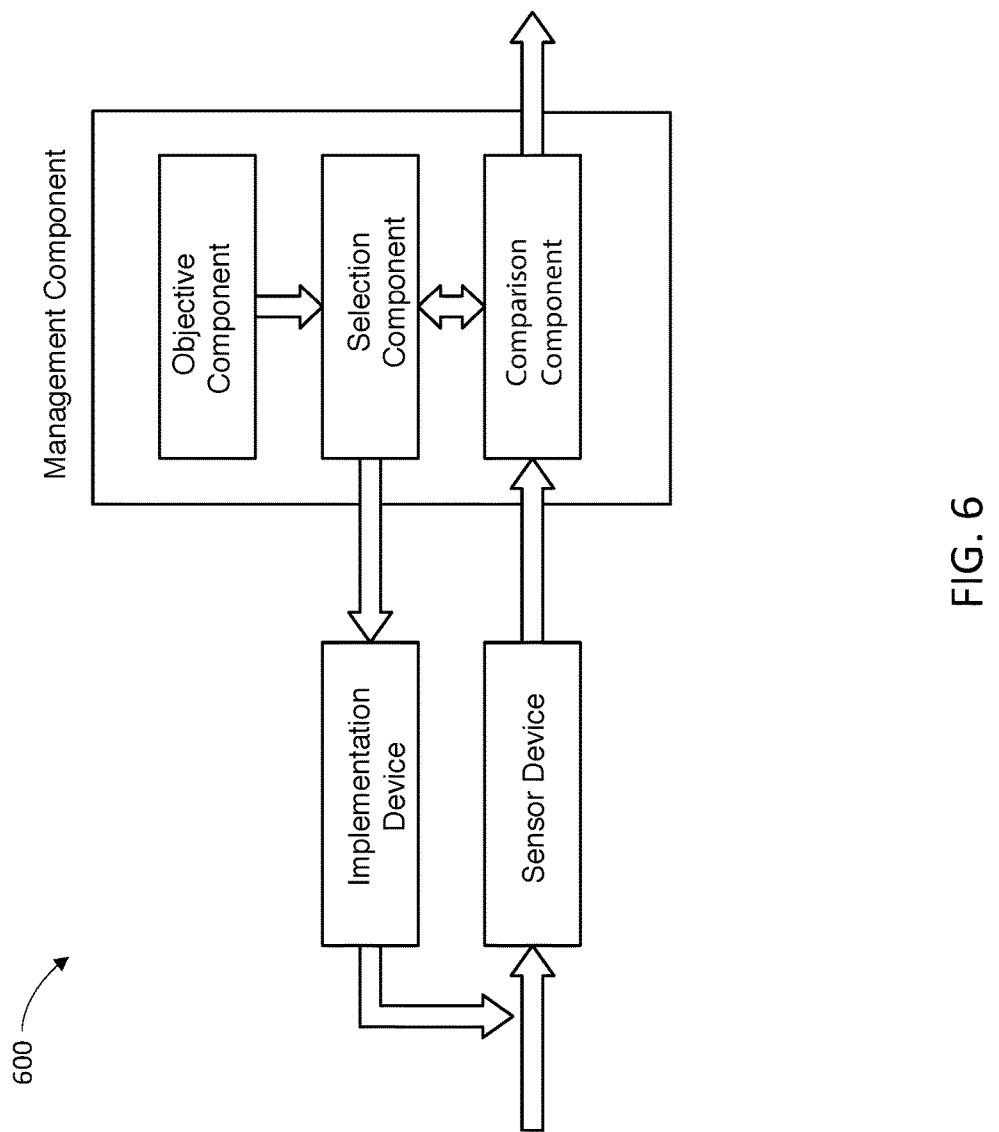
FIG. 6 is an additional block diagram depicting a control system in accordance with aspects of the present invention.

Turning now to FIG. 6 a management system 600 is depicted. In one aspect, each of the devices, components, modules, and/or functions described in FIGS. 1-5 also may apply to the devices, components, modules, and functions of FIG. 6. Also, one or more of the operations and steps of FIGS. 1-5 may be included in one or more operations or actions of FIG. 6. For example, management system 600 may be used and employed during the development of the control hierarchy, as described in FIG. 6. In this way, management system 600 may be used to facilitate designs that possess capabilities of identifying, judging, attending, perceiving, remembering, reasoning, deciding, problem solving, planning, and other cognitive demands.

The management system 600 may provide different levels of the management hierarchy for different purposes. For example, using management system 600, the management system 600 management cycle may employ a management component (which may be controlled by one or more processors such as are described in FIG. 1), one or more effector(s), and/or one or more sensor(s). The management component may include an objective component, a selection component, and/or a comparison component. A sensor device may register various stimuli. After the stimuli detected by the sensor device are converted into information or data, the information/data may be sent to the management component. The comparison component may compare the information/data with data that may be included in a knowledge domain or ontology (including standardized data or predefined data that may be used for the comparison), and any difference may result in a message or signal indicating a course of action that may correct or offer one or more suggestions to achieve an objective. The message or action may be implemented by the implementation device. Through supervisory and response feedback to the sensor device (which may also be in communication with a machine learning model/component), feedback-controlled self-regulation and self-learning may be achieved. The management component may include an objective operation to achieve the defined objective based on a standard reference (e.g., known state data or a predefined threshold standard) for the application to operate thereby, with performance or other criteria above or within the predefined threshold being labeled as normal or sufficient while performance or other criteria falling below or beyond the predefined threshold may be labeled as abnormal, insufficient, or erroneous. The management component also may include a selection component that is in communication with the implementation device.

In one aspect, the management component may formulate both the objectives and the decision rules of the system. In all layers of the hierarchy, particularly at the higher levels, the design aims may require that the system rely on learning capabilities. The management system 600 provides for adaptation to learning using one or more machine learning operations such as, for example, learning a pattern of performance that may be changed through the use of information about an application's or system's performance.

Figure 7:
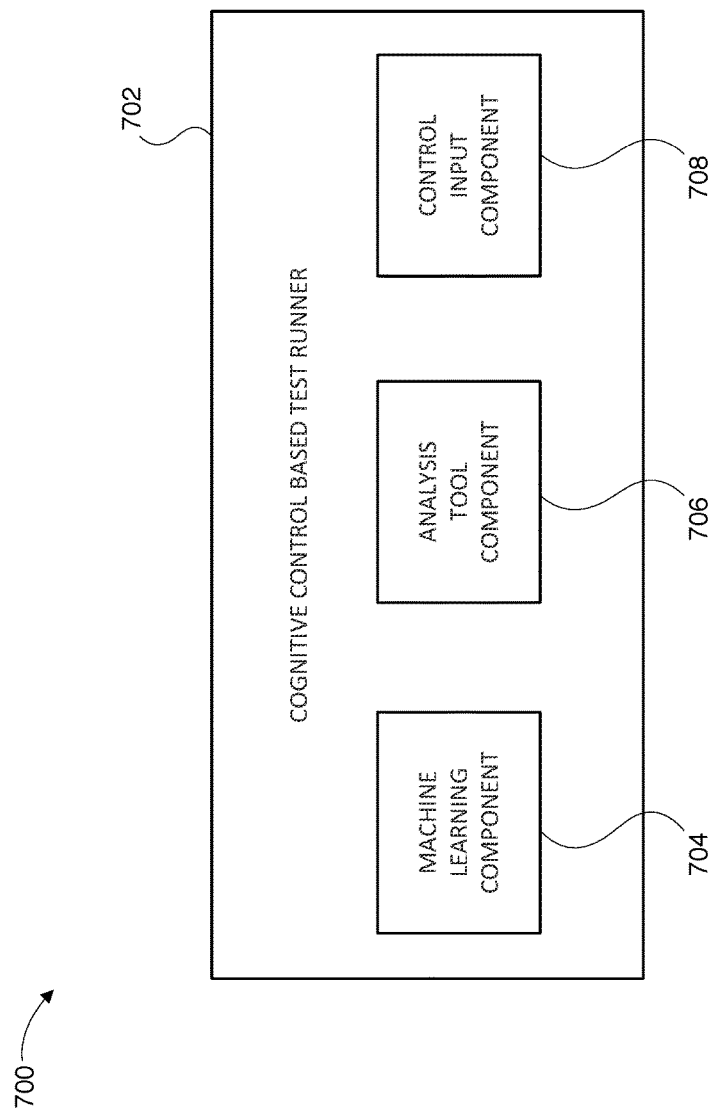
FIG. 7 is an additional block diagram depicting a cognitive control system in accordance with aspects of the present invention.

Turning now to FIG. 7, an additional block diagram representing a cognitive control system 700 is depicted. In one aspect, each of the devices, components, modules, and/or functions described in FIGS. 1-6 may also apply to the devices, components, modules, and functions of FIG. 7. Further, one or more of the operations and steps of FIGS. 1-6 may also be included in one or more operations or actions of FIG. 7. For example, the functional units of the cognitive control system 700 may be located within computer system/server 12 or elsewhere within and/or between distributed computing components.

The cognitive control system 700 may include a cognitive control based test runner 702 (or a plurality of cognitive control based test runners). The cognitive control based test runner 702 may include a machine learning component 704, an analysis tool component 706, and/or a control input component 708. The cognitive control system 700 may be trained to act as a test runner to operate other computing systems and/or applications, such as a test designed to cover functionality of analysis tool 706 by treating it as a SUT and arranging for it to reach an objective, or target state, such as a specific dialog that analysis tool 706 can display on a screen. In one aspect, the cognitive control system 700 may operate a plurality of cognitive control based test runners, such as the cognitive control system 700 simultaneously, for testing purposes. As an additional aspect, the cognitive control based test runner 702 may also be able to automatically start and/or stop the SUT.

In one aspect, the object of testing performed on an application (e.g., a SUT) by the cognitive control based test runner 702 may be to reach and achieve one or more defined target states (e.g., operator-definable target states). The cognitive control based test runner 702, testing the analysis tool SUT component 706 in reliance on control input component 708, may identify, discern, detect, and/or recognize all states known to the cognitive control based test runner 702, including the target states, by collecting the progress and recording information about the output produced by the SUT in response to one or more control inputs. Target states may be defined by an operator taking control and directing the SUT while it is under analysis by a test runner in training. In another aspect, the target states may be defined according to one or more learned states using machine learning component 704.

For example, a user of the SUT and/or the machine learning component 704 can indicate one or more specific states as target states for the cognitive control based test runner 702. While the SUT is at a specific state, including a target state, the user also can indicate to the cognitive control based test runner 702 one or more specific aspects of SUT behavior that are required or disallowed. For instance, if the SUT's target state is a dialog that includes a list-box showing file names, then the user and/or the machine learning component 704 can indicate that a specific text entry is required in the list. The user and/or the machine learning component 704 can indicate this requirement to the cognitive control based test runner 702, for example by selecting a required text field or entry with the mouse and pressing a hotkey intercepted by the cognitive control based test runner 702 via the control input component 708 to identify that the text is required. If the SUT violates this requirement during testing, then the cognitive control based test runner 702 flags a test failure. The operator and/or the machine learning component 704 may indicate a negative requirement during training, for example by selecting a set of items, such as using the mouse to highlight all the elements of a list, and pressing a separate hotkey indicating that the cognitive control based test runner 702 should prompt for the negative requirement. In response, the cognitive control based test runner 702 provides a notification, such as providing a pop-up window having its own dialog requesting an indication as to which item, such as a field or entry, should not appear on the list. If it appears during testing, the cognitive control based test runner 702 can flag a test failure. It should be noted that that these are just examples and that there could be many ways to set up the cognitive control based test runner 702 to flag positive and negative test outcomes.

As an additional example, the operator and/or the machine learning component 704 may also indicate (to the cognitive control based test runner 702) a list of conditions in which to run the SUT during testing. For example, the SUT can perform data processing on a range of data sources. The operator and/or the machine learning component 704 can indicate that the cognitive control based test runner 702 is to test each data source with a range of parameters. Verification can be fine-tuned by using the machine learning component and/or the analysis tool 706 so that certain requirements apply only to certain test scenarios and not others.

It should be noted that the machine learning component 704 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, the naive Bayes classifier, a Bayesian network, a Bayesian knowledge base, case-based reasoning, decision trees, inductive logic programming, Gaussian process regression, group method of data handling (GMDH), learning automata, learning vector quantization, minimum message length (decision trees, decision graphs, etc.), lazy learning, instance-based learning, the nearest neighbor algorithm, analogical modeling, probably approximately correct (PAC) learning, ripple down rules, a knowledge acquisition methodology, symbolic machine learning algorithms, sub-symbolic machine learning algorithms, support vector machines, random forests, ensembles of classifiers, bootstrap aggregating (bagging), boosting (i.e., the learning ensemble meta-algorithm), ordinal classification, regression analysis, information fuzzy networks (IFN), statistical classification, linear classifiers, Fisher's linear discriminant, logistic regression, the perceptron algorithm, support vector machines, quadratic classifiers, the k-nearest neighbor algorithm, and hidden Markov models. Some non-limiting examples of unsupervised learning which may be used with the present technology include the artificial neural network, data clustering, expectation-maximization, the self-organizing map, the radial basis function network, vector quantization, the generative topographic map, the information bottleneck method, IBSEAD (distributed autonomous entity systems based interaction), association rule learning, the Apriori algorithm, the Eclat algorithm, the FP-growth algorithm, hierarchical clustering, single-linkage clustering, conceptual clustering, partitional clustering, the k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning means described in this paragraph are known and are considered to be within the scope of this disclosure.

Figure 8A:
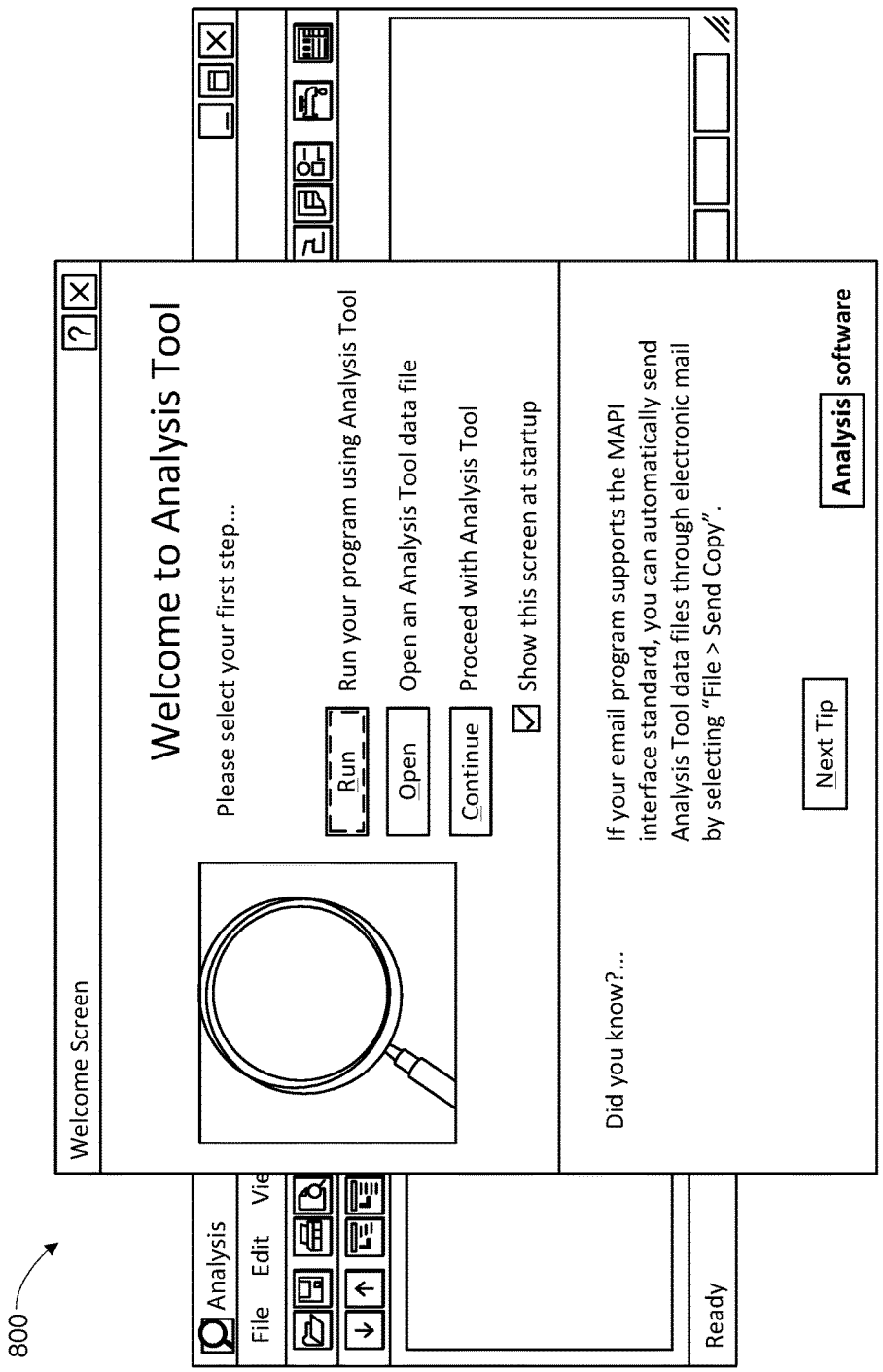
FIGS. 8A-8G are diagrams depicting a cognitive control system guiding an application to a target state in accordance with aspects of the present invention.

Consider the following example of an implementation of the aforementioned functionality, as depicted in FIGS. 8A-8G illustrating a cognitive control system 800 guiding an application to a target state. Taking a test analysis tool as an example SUT, consider a cognitive control system guiding an application to a target state with the following settings and guidelines for illustrating the example and being displayed in an interactive graphical user interface ("GUI"). A first dialog box of "Settings" may be displayed, and from there a default set of "Modules to instrument" is also displayed in a second dialog box, and finally a third dialog is displayed titled "Module Instrumentation" featuring a list of filenames. For illustration purposes, suppose that an operator identifies the "Module Instrumentation" dialog box as a target state and indicates that the test runner should require a list to include an entry with the text "msvcrt.dll". Also, suppose, for example, that in time the test analysis tool product may be enhanced by addition of a "Welcome screen" 800 as depicted in FIG. 8A, and by having its settings broken out across multiple tabs, and by going from a short list at the target state to a scrollable list, where the text "msvcrt.dll" may at test execution time appear off-screen, where it appeared immediately on-screen during test running training. That is, the cognitive control system may determine and answer the question as to what the cognitive control test runner must do to reach and validate the target state.

As depicted in FIG. 8A, the cognitive control based test runner can recognize that a new Welcome screen is not the same as the underlying screen it was trained to operate. The cognitive control based test runner may make this determination by comparing the on-screen controls and graphics of the new Welcome screen, which have no resemblance to the base screen 825 of FIG. 8B that appears once the Welcome screen is exited, to that base screen 825. The cognitive control based test runner may recognize a button to press on the Welcome screen, based on, for example, documentation of one or more types of computer program products, documentation of onscreen buttons in GUIs, and semantic analysis. Based on this analysis, the cognitive control based test runner may or may not choose to select a Continue button that may exit the dialog box. However, if the cognitive control based test runner cannot reach the expected state beyond the Welcome screen 800 (see FIG. 8A), the cognitive control based test runner may have the option to try the run again from the start, or to select a different button, or both. By a combination of trial and error and effective screen analysis, the cognitive control based test runner can get past the Welcome screen.

Figure 8B:
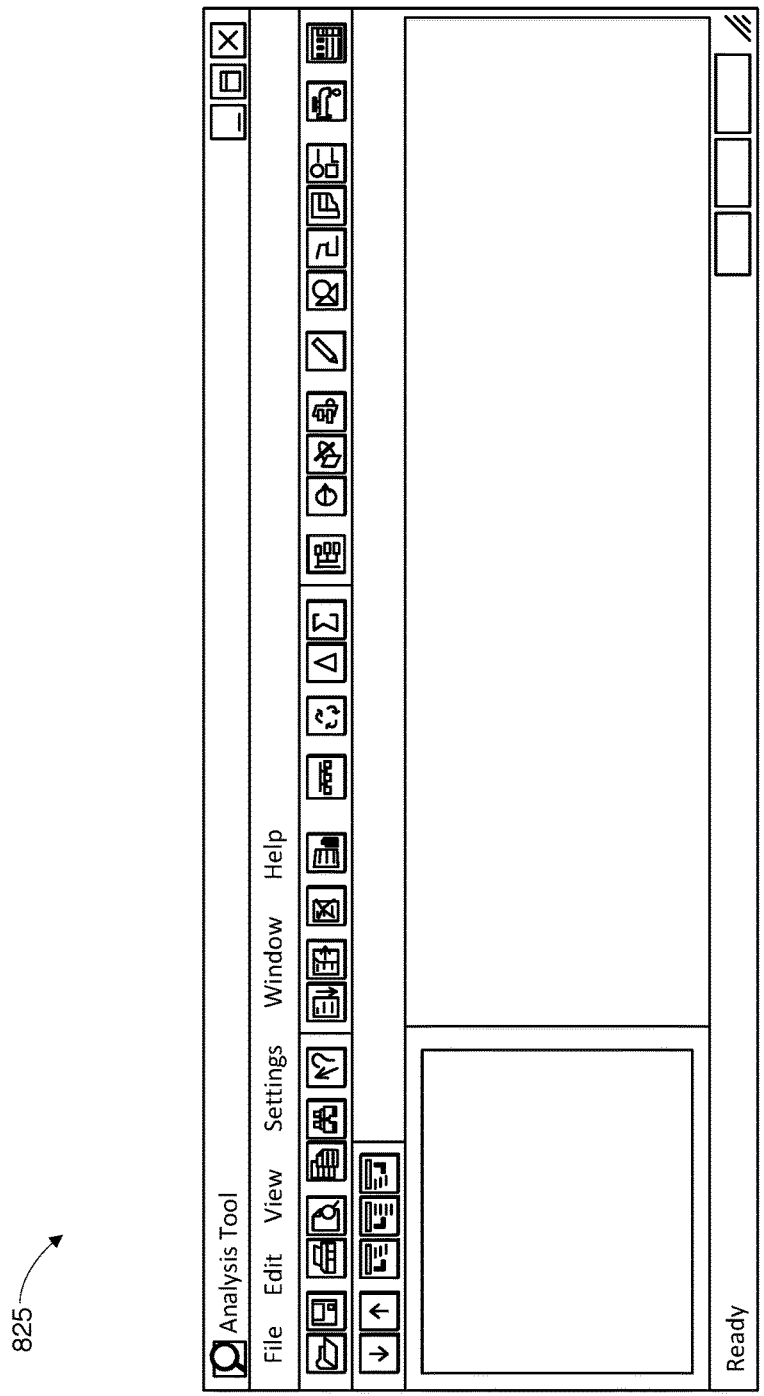

The cognitive control based test runner may then identify and recognize the base analysis tool screen 825, as depicted in FIG. 8B, that was used for training the cognitive control based test runner. The cognitive control based test runner may have observed that to reach the Settings screen (e.g., the default setting screen 835 of FIG. 8C), the cognitive control based test runner must select the Settings pulldown option as depicted in FIG. 8B.

Figure 8C:
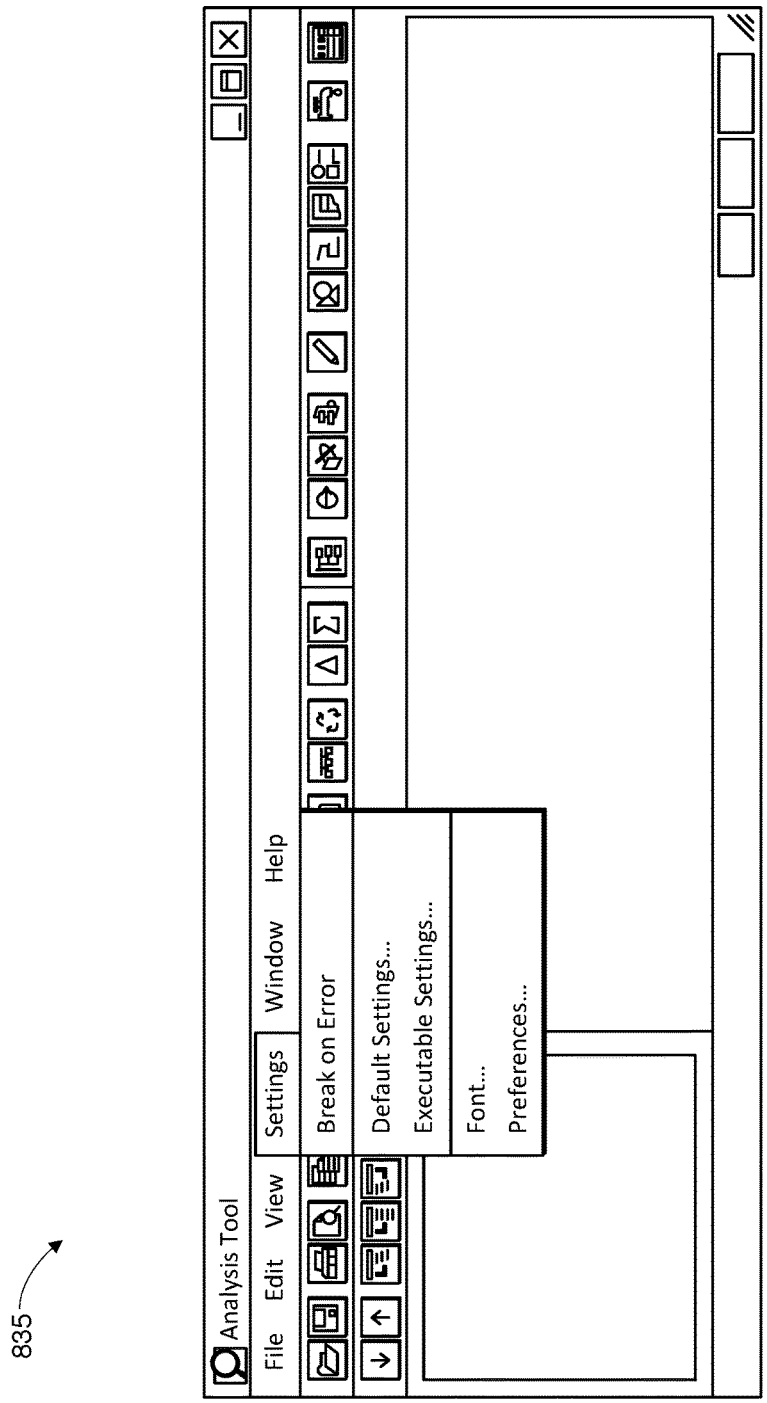

The cognitive control based test runner may identify and recognize any pulldown menu items that were used for training the cognitive control based test runner. In this example, the cognitive control based test runner may have observed that selecting "Default Settings" 835, as depicted in FIG. 8C, proceeds to an expected Default Settings dialog box, as depicted in FIG. 8D, on which the cognitive control based test runner expects to next select a "Configure" button in a "Modules to Instrument" panel.

Figure 8D:
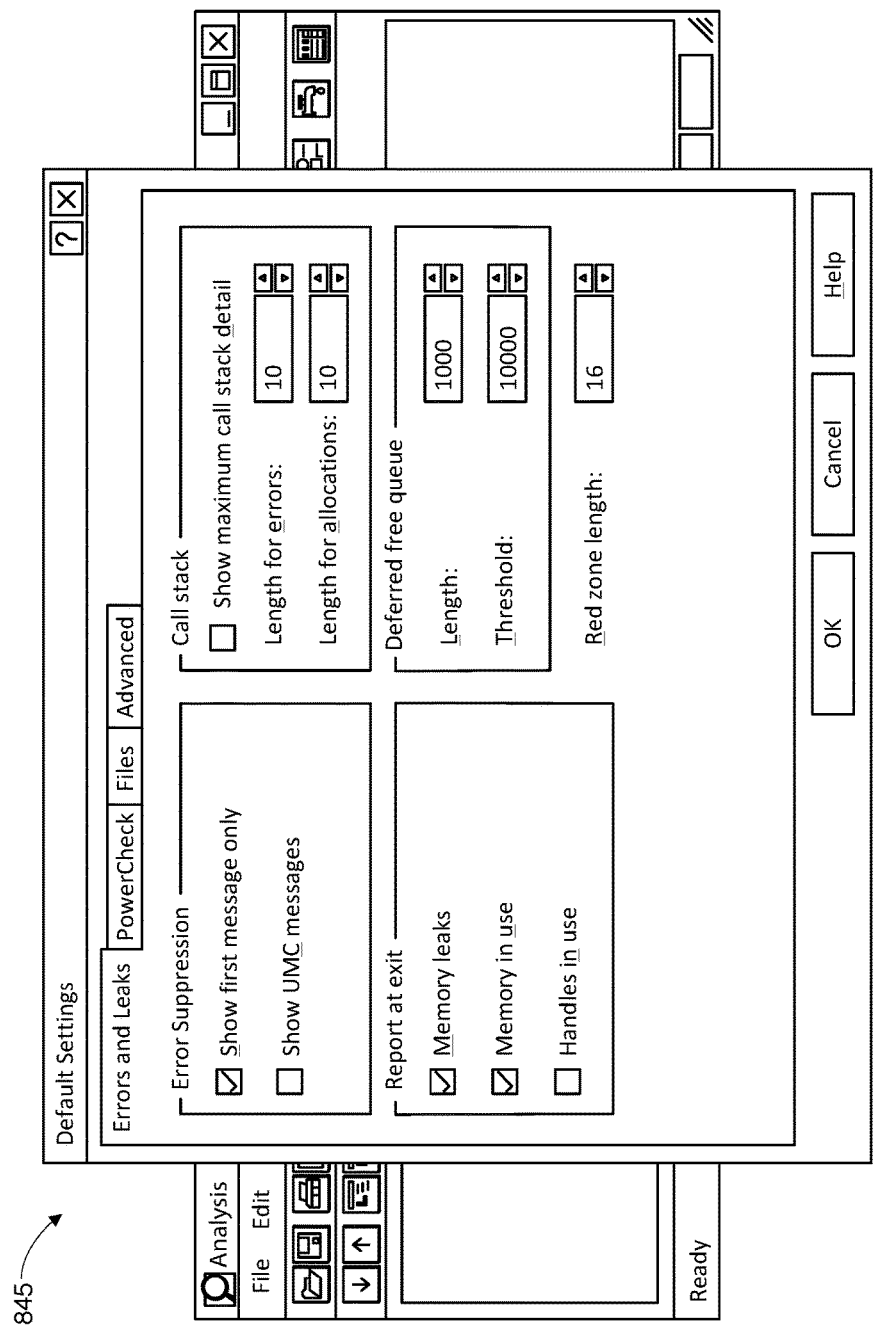
Figure 8E:
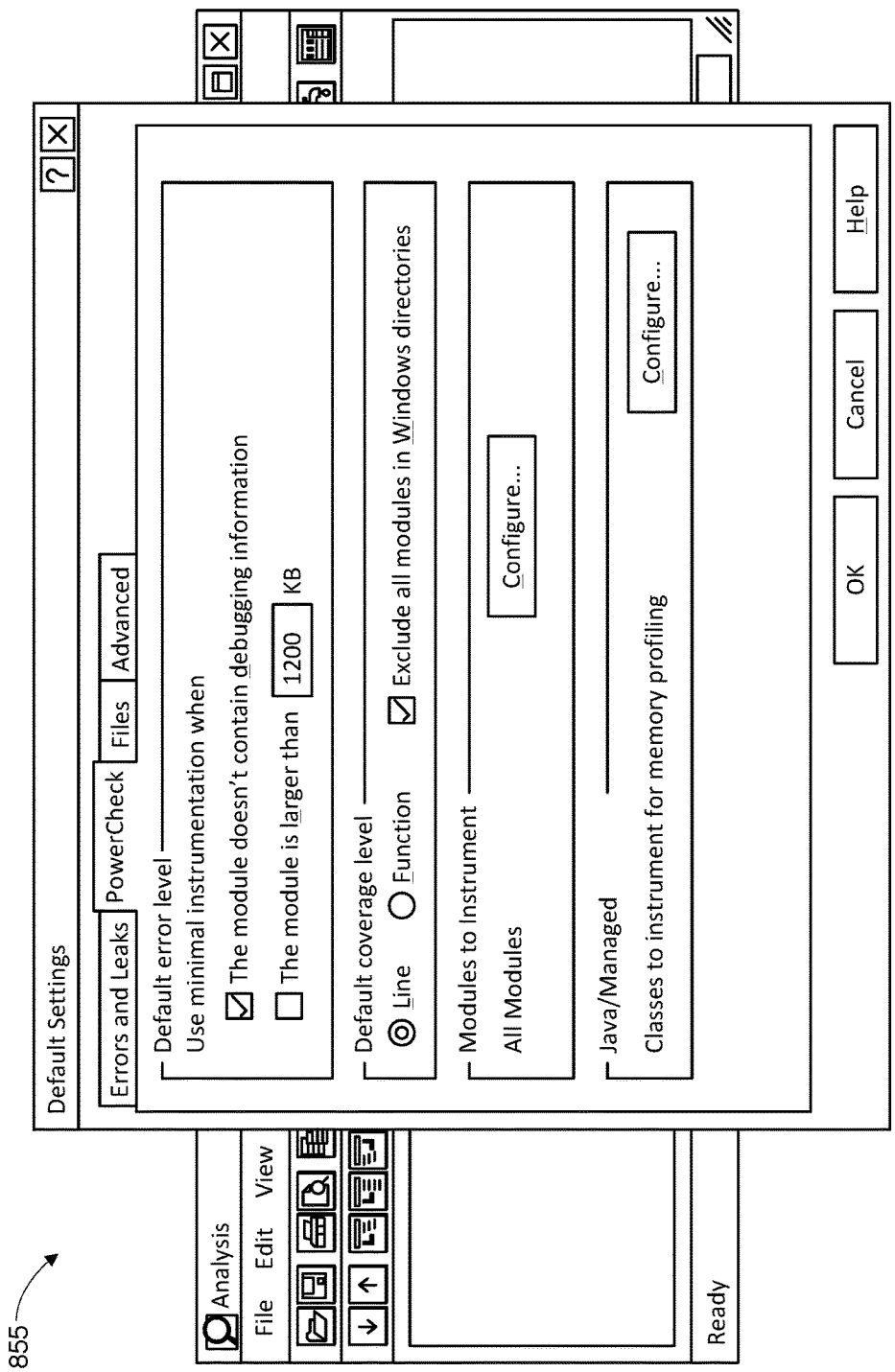

If a code update of the application (e.g., SUT) has moved the "Modules to Instrument" panel to a new tab of a tabbed view, the cognitive control based test runner may have to assess its findings at the first tab of the Default Settings dialog box 845, such as the "Errors and Leaks" tab in FIG. 8D. The cognitive control based test runner may be trained (e.g., the cognitive control based test runner may have been factory-trained or trained from manuals) to recognize a tabbed view. The cognitive control based test runner may search and identify each of the tabs, as in screens 845 and 855 of FIGS. 8D-E, in an attempt to recognize any tab that contains the "Modules to Instrument" panel that will move the cognitive control based test runner toward the target state.

Figure 8F:
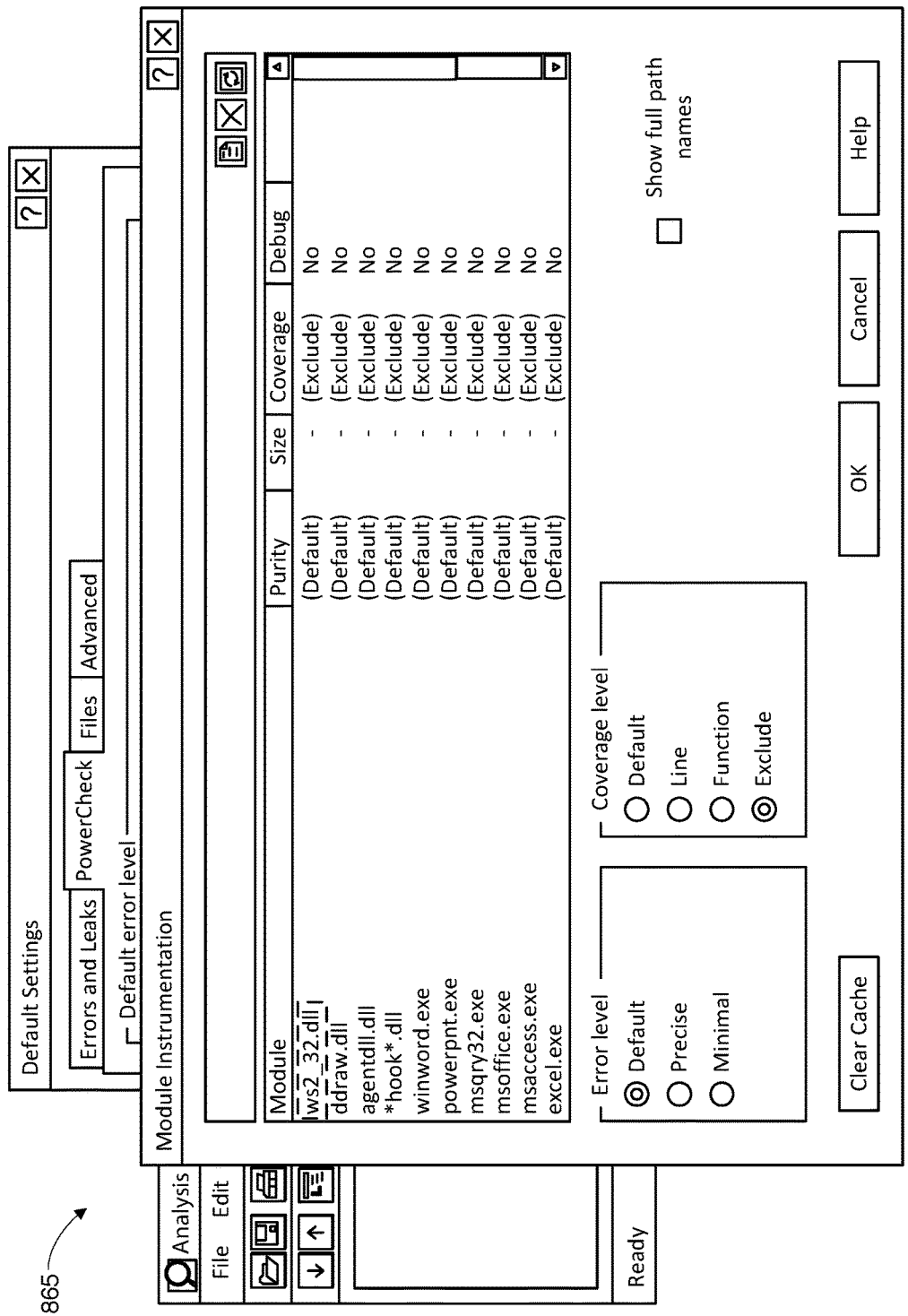
Figure 8G:
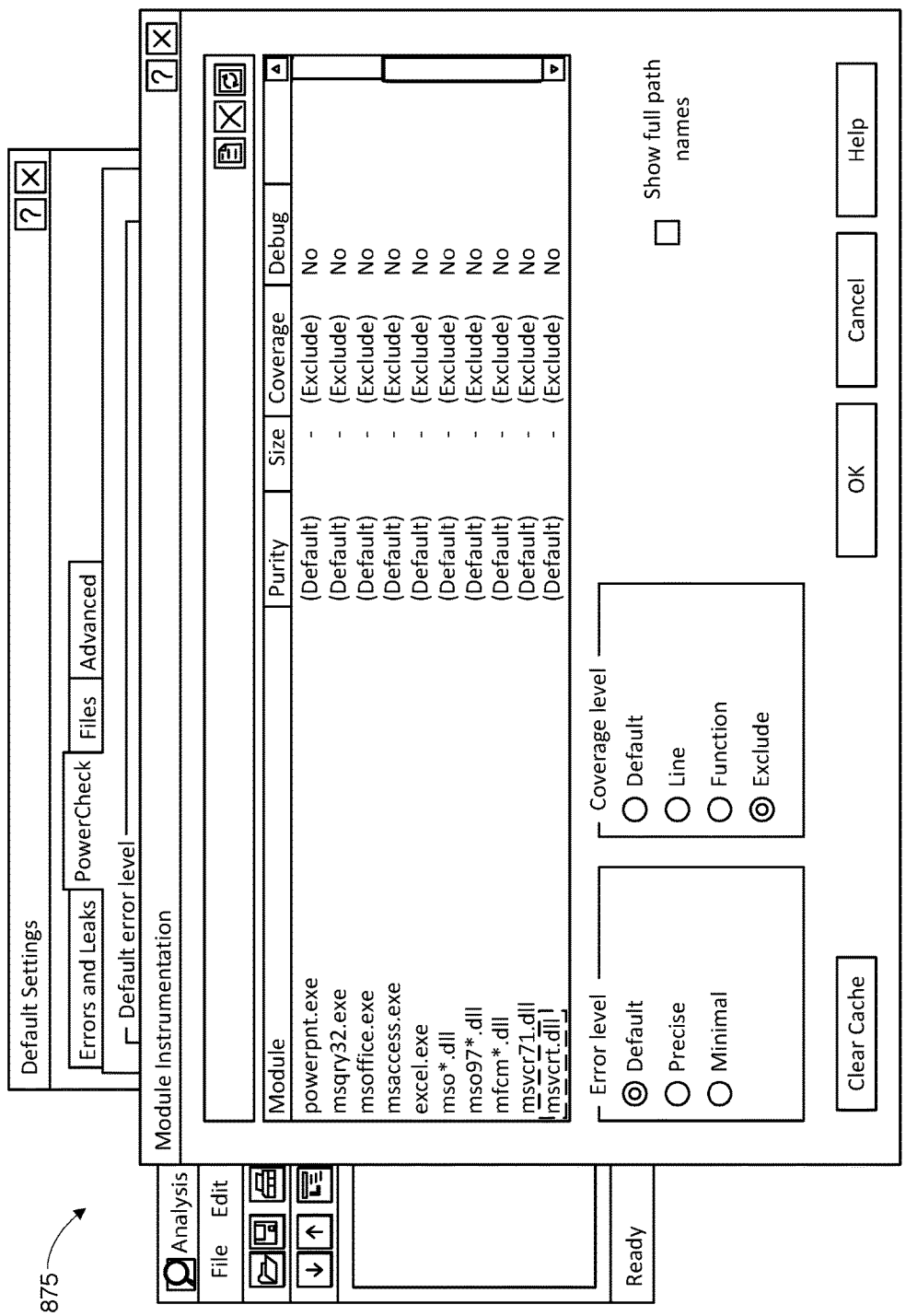

When the cognitive control based test runner observes a "Modules to Instrument" panel (screen) 865 on a tab, as illustrated in FIG. 8F (e.g., "Module Instrumentation" as illustrated in screen 865 of FIG. 8F), the cognitive control based test runner may recognize the "Modules to Instrument" panel 865 by comparing the text and button arrangement (e.g., a single button/tab labeled "Configure") with a similar state it observed during the training of the cognitive control based test runner. The cognitive control based test runner may have been trained to press the Configure button within the "Modules to Instrument" panel in order to reach the target state.

If the "Module Instrumentation" dialog box at the target state does not contain the required text, the cognitive control based test runner may have been trained to flag a test failure (e.g., issue a test failure notification). However, the cognitive control based test runner may also have been trained to recognize a scrollbar and may identify and recognize the existence or presence of the scrollbar based on the absence of the scrollbar during a training period of the cognitive control based test runner. If the cognitive control based test runner flags a failure without moving the scrollbar to check for the target text, the cognitive control based test runner may need to be retrained such as, for example, via user-directed training and/or use of machine learning. It should be noted that the SUT test should pass as successful if the required text "msvcrt.dll" is observed by the cognitive control based test runner anywhere in the scrollable list, as in "Module Instrumentation" dialog box 875 of FIG. 8G.

Figure 9:
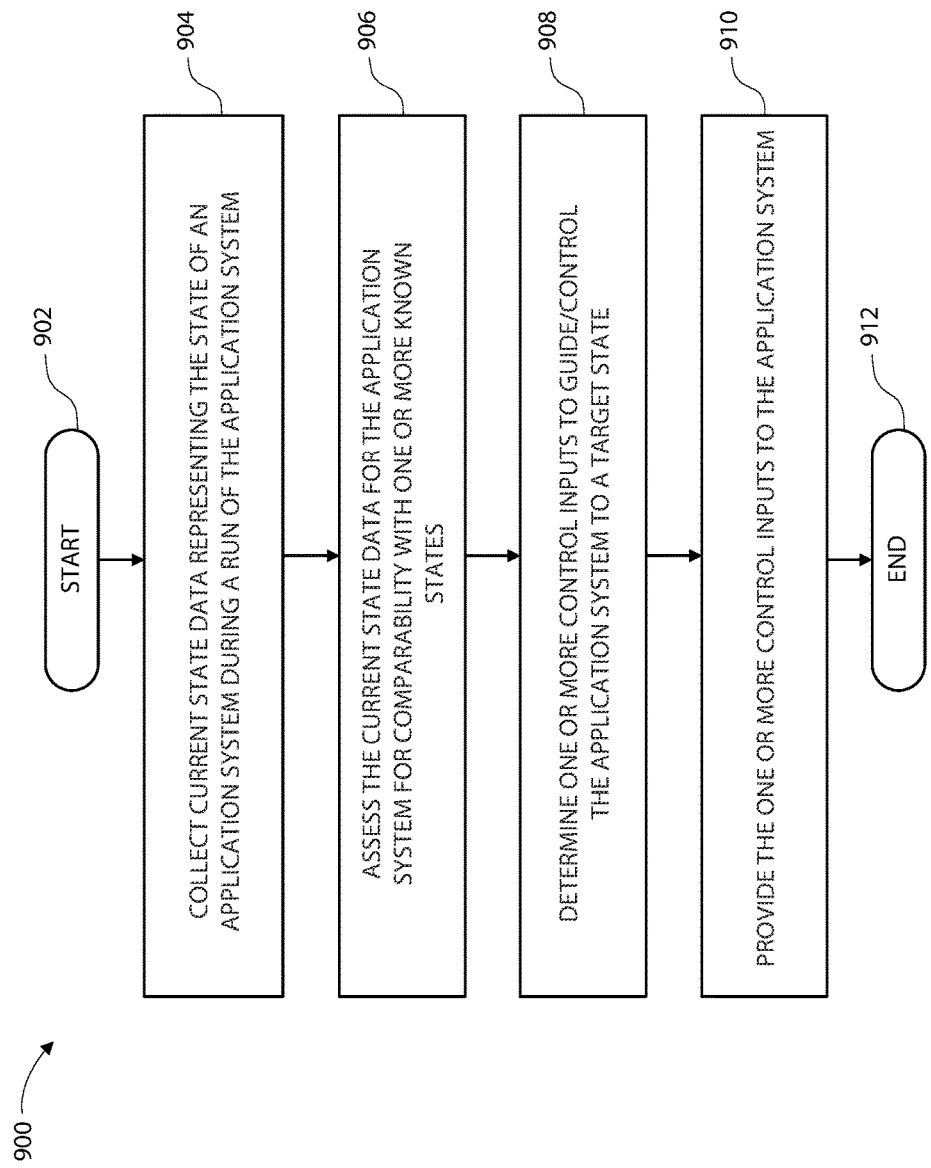
FIG. 9 is a flowchart diagram depicting an additional exemplary method for guiding an application to a target state using a cognitive control system, again in which aspects of the present invention may be realized.

Turning now to FIG. 9, a method 900 for guiding an application to a target state using a cognitive control system, again in which aspects of the present invention may be realized by a processor, is depicted. The functionality 900 may be implemented as a method executed as instructions on a machine, where the instructions are included on at least one computer readable medium or one non-transitory machine readable storage medium. The functionality 900 may start in block 902. Current state data, representing the state of an application system during a run of an application system, may be collected, as in block 904. The current state data for the application system, or SUT, may be assessed for comparability with one or more known states, as in block 906. Assessing the current state data may include semantic analysis and/or image analysis. The semantic analysis and/or image analysis may include comparing the current state data with one or more of the known states. The known states may comprise information gathered in advance (prior to the current test run) via one or more of collecting text and graphics produced, for example, during human-guided and/or computer-guided runs of the SUT, semantic and image analysis of actual output of the SUT, semantic and image analysis of documentation of the SUT, semantic and image analysis of test plans or scripts related to the SUT, and/or semantic and image analysis of general software documentation. One or more control inputs may be determined to guide/control the application system to a target state, as in block 908. The one or more control inputs may be provided to the application system, as in block 910. The functionality 900 may end in block 912.

Figure 10:
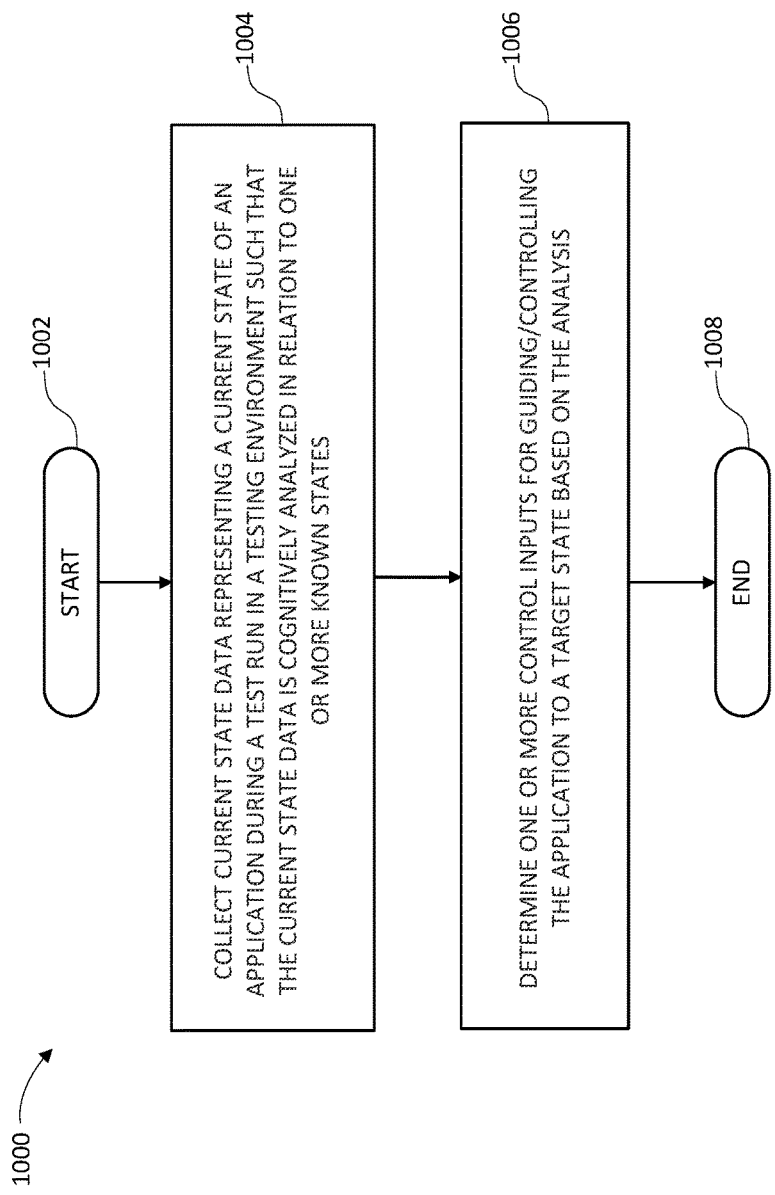
FIG. 10 is an additional flowchart diagram depicting an exemplary method for guiding an application to a target state using a cognitive control system by a processor; again, in which aspects of the present invention may be realized.

Turning now to FIG. 10, a method 1000 for guiding an application to a target state using a cognitive control system, by a processor, is depicted. The functionality 1000 may be implemented as a method executed as instructions on a machine, where the instructions are included on at least one computer readable medium or one non-transitory machine readable storage medium. The functionality 1000 may start in block 1002. Current state data representing a current state of an application during a test run in a testing environment may be collected such that the current state data is cognitively analyzed in relation to one or more known states, as in block 1004. One or more control inputs for guiding/controlling the application to reach a targetstate may be determined based on the analysis, as in block 1006. The functionality 1000 may end, as in block 1008.

In one aspect, in conjunction with and/or as part of at least one block of FIG. 9 or 10, the operations of methods 900 and/or 1000 may include each of the following. The operations of methods 900 and/or 1000 may include comparing the current state data with the one or more known states, wherein the one or more known states include information collected prior to the test run by collecting text data and graphic data produced during a prior test run, performing a semantic analysis and image analysis resulting from execution of the application, or performing a semantic analysis and image analysis relating to a data source of the application. The operations of methods 900 and/or 1000 may include using and/or implementing a machine learning mechanism for providing the one or more control inputs to the application. A semantic analysis and/or image analysis may be performed on the current state data.

Additionally, the operations of methods 900 and/or 1000 may include determining one or more situation assessments according to a semantic analysis or image analysis on the current state data; performing a semantic analysis or image analysis on documentation of the application, and/or cognitively interpreting results and timing of the results of the one or more control inputs, wherein each state change based on the one or more control inputs of the application is tracked. The operations of methods 900 and/or 1000 may include determining or analyzing one or more responses by the application to one or more control inputs previously used during the execution. The one or more control inputs can take the form of simulation or generation of keyboard, mouse, or other events fed into the application, generation of DOM events or Web driver events fed into a Web-based aspect of the application, generation of messages or Application Program Interface ("API") function calls, robotic manipulation of a tangible input device, or any other form of control input applicable to arrange application guidance via cognitive control.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, implemented by one or more processors, for controlling an application, comprising:
   collecting current state data representing a current state of an application during a test run in a testing environment such that the current state data is cognitively analyzed in relation to one or more known states;
   determining one or more control inputs to guide the application to a target state based on the cognitive analysis; and
   performing a validation testing operation on the application during the test run in the testing environment by a cognitive control based test runner according to the one or more determined control inputs to guide the application to the target state based on the cognitive analysis, wherein the one or more determined control inputs guide the application to the target state based on the cognitive analysis during the validation testing operation on the application notwithstanding changes that have occurred to a display content, style, color, and whether new intervening levels of additional or modified dialogs exist in the application from a prior test run in the testing environment.

2. The method of claim 1, further including comparing the current state data with the one or more known states, wherein the one or more known states include information collected prior to the test run in the testing environment by collecting one or more of text data and graphic data produced during the prior test run in the testing environment, performing a semantic analysis and an image analysis resulting from execution of the application, or performing a semantic analysis and an image analysis relating to a data source of the application.

3. The method of claim 1, further including implementing a machine learning mechanism to provide the one or more determined control inputs to the application.

4. The method of claim 1, further including performing a semantic analysis or an image analysis on the current state data.

5. The method of claim 1, further including:
   determining one or more situation assessments according to a semantic analysis or an image analysis on the current state data; or
   performing a semantic analysis or an image analysis on documentation of the application.

6. The method of claim 1, further including cognitively interpreting results of the one or more determined control inputs and timing of the results of the one or more determined control inputs, wherein each state change based on the one or more determined control inputs is tracked.

7. The method of claim 1, further including determining one or more responses by the application to one or more determined control inputs previously used during execution of the application.

8. A system for controlling an application, comprising: one or more processors, that:
   collect current state data representing a current state of an application during a test run in a testing environment such that the current state data is cognitively analyzed in relation to one or more known states;
   determine one or more control inputs to guide the application to a target state based on the cognitive analysis; and
   perform a validation testing operation on the application during the test run in the testing environment by a cognitive control based test runner according to the one or more determined control inputs to guide the application to the target state based on the cognitive analysis, wherein the one or more determined control inputs guide the application to the target state based on the cognitive analysis during the validation testing operation on the application notwithstanding changes that have occurred to a display content, style, color, and whether new intervening levels of additional or modified dialogs exist in the application from a prior test run in the testing environment.

9. The system of claim 8, wherein the one or more processors compare the current state data with the one or more known states, and wherein the one or more known states include information collected prior to the test run in the testing environment by collecting one or more of text data and graphic data produced during the prior test run in the testing environment, performing a semantic analysis and an image analysis resulting from execution of the application, or performing a semantic analysis and an image analysis relating to a data source of the application.

10. The system of claim 8, wherein the one or more processors implement a machine learning mechanism to provide the one or more determined control inputs to the application.

11. The system of claim 8, wherein the one or more processors perform a semantic analysis or an image analysis on the current state data.

12. The system of claim 8, wherein the one or more processors:
   determine one or more situation assessments according to a semantic analysis or an image analysis on the current state data; or
   perform a semantic analysis or an image analysis on documentation of the application.

13. The system of claim 8, wherein the one or more processors cognitively interpret results of the one or more determined control inputs and timing of the results of the one or more determined control inputs, wherein each state change based on the one or more determined control inputs is tracked.

14. The system of claim 8, wherein the one or more processors determine one or more responses by the application to one or more determined control inputs previously used during execution of the application.

15. A computer program product, for controlling an application by one or more processors, the computer program product comprising a non-transitory computer readable storage medium having computer readable program code portions stored therein, the computer readable program code portions comprising:
   an executable portion that collects current state data representing a current state of an application during a test run in a testing environment such that the current state data is cognitively analyzed in relation to one or more known states;
   an executable portion that determines one or more control inputs to guide the application to a target state based on the cognitive analysis; and
   an executable portion that performs a validation testing operation on the application during the test run in the testing environment by a cognitive control based test runner according to the one or more determined control inputs to guide the application to the target state based on the cognitive analysis, wherein the or more determined control inputs guide the application to the target state based on the cognitive analysis during the validation testing operation on the application notwithstanding changes that have occurred to a display content, style, color, and whether new intervening levels of additional or modified dialogs exist in the application from a prior test run in the testing environment.

16. The computer program product of claim 15, further including an executable portion that compares the current state data with the one or more known states, wherein the one or more known states include information collected prior to the test run in the testing environment by collecting one or more of text data and graphic data produced during the prior test run in the testing environment, performing a semantic analysis and an image analysis resulting from execution of the application, or performing a semantic analysis and an image analysis relating to a data source of the application.

17. The computer program product of claim 15, further including an executable portion that implements a machine learning mechanism to provide the one or more determined control inputs to the application.

18. The computer program product of claim 15, further including an executable portion that performs a semantic analysis or an image analysis on the current state data.

19. The computer program product of claim 15, further including an executable portion that:

determines one or more situation assessments according to a semantic analysis or an image analysis on the current state data; or performs a semantic analysis or an image analysis on documentation of the application.

20. The computer program product of claim 15, further including an executable portion that:

cognitively interprets results of the one or more determined control inputs and timing of the results of the one or more determined control inputs, wherein each state change based on the one or more determined control inputs is tracked; or determines one or more responses by the application to one or more determined control inputs previously used during execution of the application.

\* \* \* \* \*